(12) United States Patent
Uttaro et al.

(10) Patent No.: US 11,142,362 B2
(45) Date of Patent: Oct. 12, 2021

(54) FILM SEALING AND WRAPPING MACHINE WITH ROTARY CUT AND SEAL JAW

(71) Applicant: EXTREME PACKAGING MACHINERY, INC., Rancho Santa Margarita, CA (US)

(72) Inventors: Raymond Uttaro, San Juan Capistrano, CA (US); John Robinson, Mission Viejo, CA (US); Michel Laurin, Lake Elsinore, CA (US)

(73) Assignee: nVenia LLC, Schiller Park, IL (US)

( * ) Notice: Subject to any disclaimer, the term of this patent is extended or adjusted under 35 U.S.C. 154(b) by 523 days.

(21) Appl. No.: 15/597,489

(22) Filed: May 17, 2017

(65) Prior Publication Data

US 2017/0246754 A1    Aug. 31, 2017

Related U.S. Application Data

(60) Continuation of application No. 14/098,238, filed on Dec. 5, 2013, now abandoned, which is a division of
(Continued)

(51) Int. Cl.
*B65B 51/30* (2006.01)
*B29C 65/18* (2006.01)
(Continued)

(52) U.S. Cl.
CPC ............ *B65B 51/306* (2013.01); *B26D 1/565* (2013.01); *B29C 65/18* (2013.01); *B29C 65/743* (2013.01);
(Continued)

(58) Field of Classification Search
CPC ... B26D 1/565; B29C 65/743; B29C 65/7433; B29C 65/7435; B29C 66/8226–82265; B29C 66/4312; B29C 66/43121; B29C 66/8161; B29C 66/81611; B29C 66/8163; B29C 66/8165; B29C 66/8167;
(Continued)

(56) References Cited

U.S. PATENT DOCUMENTS 2,237,119 A    4/1941  Smith
3,438,173 A *  4/1969  Omori ................. B29C 66/4312
                                                         53/479
(Continued)

FOREIGN PATENT DOCUMENTS

DE            3923235 A1 *  1/1991  ............. B29C 65/18
DE     102004049376 A1 *  4/2006  ........... B65B 51/303
(Continued)

*Primary Examiner* — Joshua G Kotis
(74) *Attorney, Agent, or Firm* — Levenfeld Pearlstein, LLC

(57) ABSTRACT

The film sealing and wrapping machine with a rotary cut and seal jaw is provided. The rotary cut and seal jaw has an internal sliding mechanism which provides for smooth and quiet operation. The rotational speed of the jaw may be varied to increase through put and to provide for a title bag around products. The rotary cut and seal jaw may comprise a seal bar and pressure pad may both be spring loaded to self align the seal bar and pressure pad during the sealing and cutting process. Lastly, a gap defined by a belt disposed upstream and downstream of the seal bar and pressure pad may be mechanically linked to the pressure pad through a control carriage.

4 Claims, 7 Drawing Sheets

Related U.S. Application Data application No. 13/308,226, filed on Nov. 30, 2011, now Pat. No. 8,621,830, which is a continuation of application No. 12/427,654, filed on Apr. 21, 2009, now Pat. No. 8,087,220.

(51) Int. Cl.

| | | |
|---|---|---|
| *B65B 61/08* | (2006.01) | |
| *B29C 65/74* | (2006.01) | |
| *B29C 65/00* | (2006.01) | |
| *B26D 1/56* | (2006.01) | |
| B26D 7/27 | (2006.01) | |
| B26D 7/26 | (2006.01) | |
| B29K 23/00 | (2006.01) | |
| B29K 27/06 | (2006.01) | |

(52) U.S. Cl.
CPC ...... *B29C 66/1122* (2013.01); *B29C 66/4312* (2013.01); *B29C 66/8161* (2013.01); *B29C 66/8225* (2013.01); *B29C 66/83543* (2013.01); *B29C 66/849* (2013.01); *B29C 66/8412* (2013.01); *B29C 66/8491* (2013.01); *B29C 66/93441* (2013.01); *B29C 66/93451* (2013.01); *B65B 61/08* (2013.01); *B26D 7/27* (2013.01); *B26D 2007/2671* (2013.01); *B29C 66/71* (2013.01); *B29C 66/73715* (2013.01); *B29C 66/934* (2013.01); *B29K 2023/00* (2013.01); *B29K 2023/06* (2013.01); *B29K 2027/06* (2013.01); *Y10T 83/4812* (2015.04)

(58) Field of Classification Search
CPC .......... B29C 66/8225; B29C 66/83541; B29C 66/83543; B29C 66/849; B29C 66/8491; B29C 66/9261; B29C 66/92611; B29C 66/92651; B29C 66/92653; B29C 66/92655; B65B 61/08; B65B 51/16; B65B 51/306
USPC ........ 53/450, 451, 374.4, 374.5, 374.6, 548, 53/550–552
See application file for complete search history.

(56) References Cited

U.S. PATENT DOCUMENTS

| | | | |
|---|---|---|---|
| 3,473,288 A | 10/1969 | Ishizaki et al. | |
| 3,522,689 A | 8/1970 | Wylie | |
| 3,564,810 A | 2/1971 | Faletti | |
| 3,585,097 A * | 6/1971 | Beason ................ | B65H 27/00 156/583.4 |
| 3,861,260 A * | 1/1975 | Kesten ................ | B21D 43/028 83/328 |
| 4,048,003 A | 9/1977 | Bolli | |
| 4,134,245 A | 1/1979 | Stella | |
| 4,199,919 A | 4/1980 | Moscatelli | |
| 4,250,796 A | 2/1981 | Achelpohl | |
| 4,433,527 A | 2/1984 | Ramsey | |
| 4,608,797 A | 9/1986 | Shabram | |
| 4,622,793 A * | 11/1986 | Oki ..................... | B29C 66/1122 156/583.1 |
| 4,630,429 A | 12/1986 | Christine | |
| 4,750,313 A | 6/1988 | Kammler | |
| 4,807,426 A | 2/1989 | Smith | |
| 4,838,981 A * | 6/1989 | Fioravanti ............ | B29C 65/18 156/515 |
| 5,269,123 A | 12/1993 | Marchesini | |
| 5,282,349 A | 2/1994 | Siegel | |
| 5,371,999 A | 12/1994 | Hansen et al. | |
| 5,475,964 A | 12/1995 | Fiesser et al. | |
| 5,548,946 A | 8/1996 | Holub | |
| 5,622,033 A * | 4/1997 | Fukuda ................ | B29C 66/3432 53/551 |
| 5,685,131 A | 11/1997 | Spatolisano et al. | |
| 5,771,660 A | 6/1998 | Loewenthal | |
| 5,778,641 A | 7/1998 | Simionato | |
| 5,870,887 A | 2/1999 | Bennett | |
| 5,921,068 A * | 7/1999 | Fangmeier ........... | B29C 66/849 53/551 |
| 6,122,894 A | 9/2000 | Romagnoli | |
| 6,138,442 A * | 10/2000 | Howard ................ | B65B 51/30 53/373.7 |
| 6,161,366 A | 12/2000 | Bausch et al. | |
| 6,178,719 B1 | 1/2001 | Hansen | |
| 6,178,726 B1 | 1/2001 | Takigawa | |
| 6,408,596 B1 * | 6/2002 | Kammler ............. | B29C 65/18 53/373.7 |
| 6,854,242 B2 | 2/2005 | Stork et al. | |
| 6,889,481 B2 | 5/2005 | Helwig et al. | |
| 7,178,314 B2 | 2/2007 | Chomik et al. | |
| 7,383,671 B2 | 6/2008 | Conti | |
| 8,087,220 B2 | 1/2012 | Uttaro et al. | |
| 8,621,830 B2 | 1/2014 | Uttaro et al. | |
| 2004/0134624 A1 * | 7/2004 | De Barnardi .......... | B29C 65/02 156/553 |
| 2004/0256373 A1 * | 12/2004 | Irwin ..................... | B65B 9/067 219/243 |
| 2005/0103171 A1 * | 5/2005 | Bradbury ............... | B23D 25/10 83/13 |
| 2005/0193879 A1 * | 9/2005 | Champeau ............ | B26D 1/565 83/13 |
| 2005/0274262 A1 * | 12/2005 | Recchia, Jr. .......... | B29C 65/18 99/353 |
| 2007/0199279 A1 * | 8/2007 | Vezzani ............... | B29C 66/8226 53/374.5 |
| 2008/0066430 A1 * | 3/2008 | Lubezny .............. | B29C 65/18 53/451 |

FOREIGN PATENT DOCUMENTS

| | | | |
|---|---|---|---|
| EP | 1810922 | 7/2007 | |
| EP | 1810922 A1 * | 7/2007 | ............... B65B 9/02 |
| FR | 2893306 A1 * | 5/2007 | ......... B29C 65/7451 |

* cited by examiner

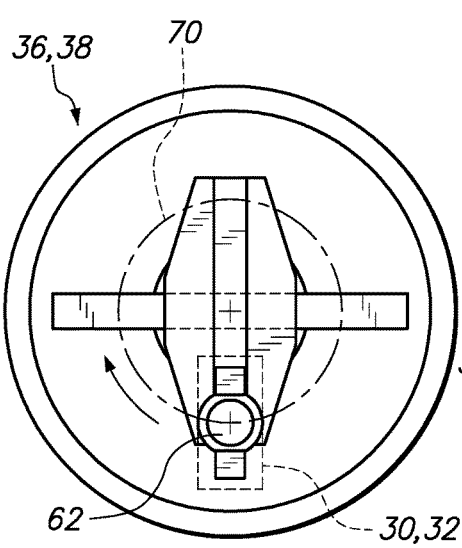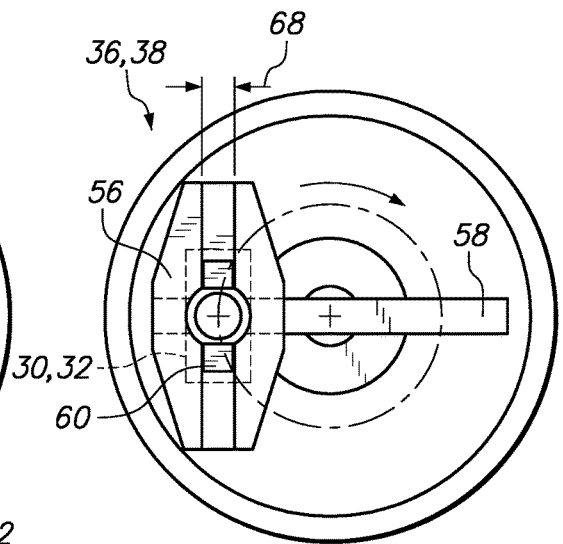
FIG. 4A    FIG. 4B
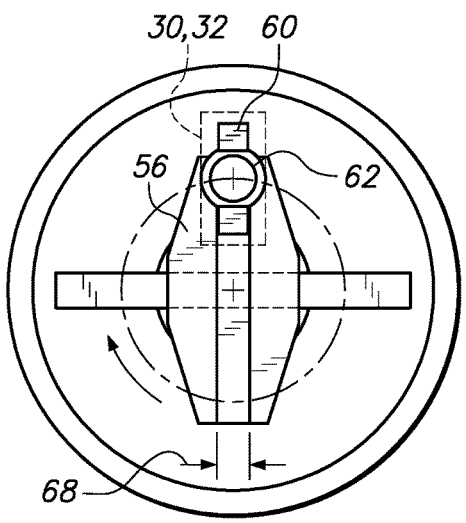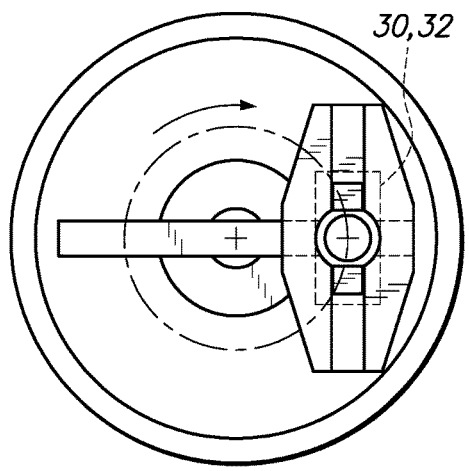
FIG. 4C    FIG. 4D

_FILM SEALING AND WRAPPING MACHINE WITH ROTARY CUT AND SEAL JAW_

CROSS-REFERENCE TO RELATED APPLICATIONS

The present application is a continuation of U.S. patent application Ser. No. 14/098,238, filed on Dec. 5, 2013, which is a divisional patent application of U.S. patent application Ser. No. 13/308,226, filed on Nov. 30, 2011, which is a continuation patent application of U.S. Patent App. Ser. No. 12/427,654, filed on Apr. 21, 2009, the entire contents of which are incorporated herein by reference.

STATEMENT RE: FEDERALLY SPONSORED RESEARCH/DEVELOPMENT

Not Applicable

BACKGROUND

The present invention relates to a film sealing and wrapping machine with a rotary cut and seal jaw for wrapping a product with heat sealable material.

Prior art shrink wrap machines exist which are used to form a film bag around a product in a high production environment. Extreme Packaging, Inc. located in Orange County, Calif. is a manufacturer of high quality shrink wrap machines and has a philosophy of innovation and continuously improving their machines to increase efficiency. Extreme Packaging, Inc. has been producing high quality shrink wrap machines for the past 10 years.

The film sealing and wrapping machine discussed herein is an improvement of prior art shrink wrap machines.

BRIEF SUMMARY

The film sealing and wrapping machine discussed herein addresses the deficiencies with respect to prior art shrink wrap machines.

A film sealing and wrapping machine generally forms a tube around a plurality of products. In a sealing and cutting section of the film sealing and wrapping machine, cross seals and cuts are made between adjacent products to form individually film wrapped products. To improve the through put of the film sealing and wrapping machine and provide for a stronger seal and tighter bag or film bag, the sealing and cutting section of the film sealing and wrapping machine discussed herein incorporates one or more of the following aspects.

First, the sealing and cutting section has a rotary head with a sliding mechanism within rotary drums of the rotary head. The sliding mechanism provides for smooth, non-jerky operation as the rotary drums traverse a seal bar and pressure pad along a circular path. The sliding mechanism is enclosed within a lubricated housing that requires less maintenance and is quieter than geared mechanisms. The sliding mechanism has substantially less back lash compared to gearing systems. Since the sliding mechanism holds a tighter tolerance than gearing systems, the sliding mechanism encourages a more consistent positive pressure upon the film which results in consistently stronger seals and positive bag cutoffs thereby producing fewer rejects and higher efficiencies.

Second, the rotational speed of the rotating drums are adjusted as a function of product length and product height. The adjustments to the speed of the rotary drums allow adjacent products to be placed closer to each other and form smaller or tighter bags around each product thereby increasing through put of the film sealing and wrapping machine and also providing a tighter film bag.

Third, both the upper seal bar and the lower pressure pad may be spring loaded such that as the seal bar and pressure pad contact each other, the point of contact between the seal bar and pressure pad traverses in a horizontal plane generally parallel to a path of travel of the product. As such, the film is not pushed, pulled or deformed due to vertical movement of the seal bar and pressure pad during the sealing and cutting process. Rather, the point of contact between the seal bar and pressure pad is maintained parallel to the product's path of travel such that the seal bar and pressure pad forms a cross seal along the tube of film and cuts the tube of film without significantly disturbing the film.

Fourth, the seal bar and pressure pad traverse a circular path associated with the rotation of the rotating drums. During the rotation, the seal bar and pressure pad has a horizontal component of movement (i.e., left to right and right to left). The sealing and cutting section comprises a single belt that is guided by a series of pulleys upstream and downstream of the seal bar and the pressure pad. The belt forms a gap between which the seal bar and the pressure pad meet to perform sealing and cutting steps. During rotation of the seal bar and pressure pad, the gap defined by the belt must track the horizontal location of the seal bar and the pressure pad. To this end, the gap is mechanically linked to the lower pressure pad through a control carriage.

Additionally, the seal bar and the pressure pad may both be heated such as when sealing and wrapping cold products.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 4A is a cross sectional view of the rotary drum with a crank throw at a 6 o'clock position;

FIG. 4B is an illustration of the rotary drum shown in FIG. 4A with the crank throw at a 9 o'clock position;

FIG. 4C illustrates the rotary drum shown in FIG. 4A with the crank throw at a 12 o'clock position;

FIG. 4D illustrates the rotary drum of FIG. 4A with the crank throw at a 3 o'clock position;

DETAILED DESCRIPTION

Figure 1:
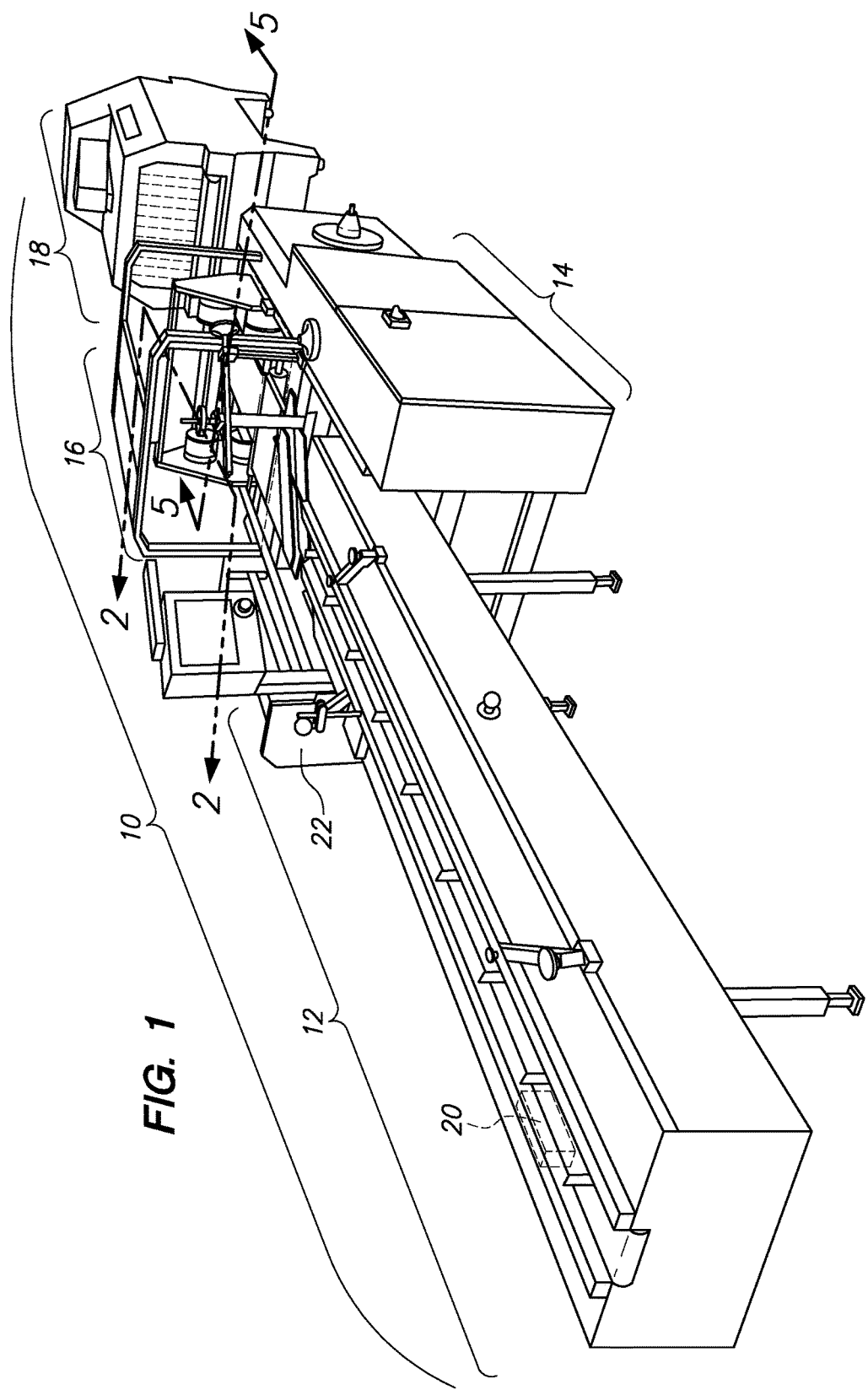
FIG. 1 is a perspective view of a film sealing and wrapping machine.
Figure 2:
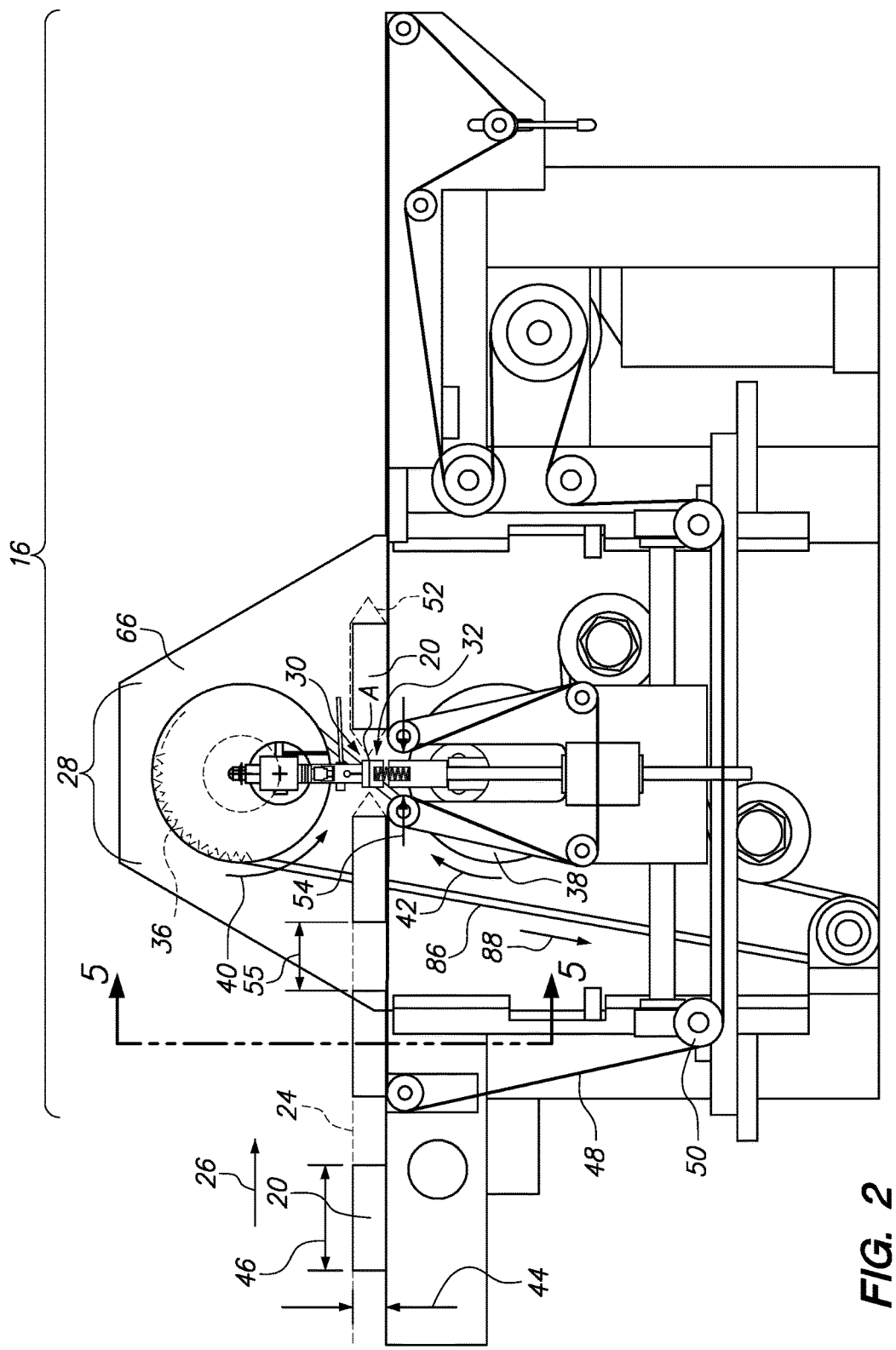
FIG. 2 is a cross sectional view of a sealing and cutting section of the film sealing and wrapping machine shown in FIG. 1.

Referring now to FIG. 1, a film sealing and wrapping machine 10 is shown. The film sealing and wrapping machine 10 may comprise a feed unit 12, a wrapping section 14, a sealing and cutting section 16 and an optional shrink tunnel 18. As product 20 is propelled into the wrapping section 14, a film delivery system 22 supplies wrapping film 24 (see FIG. 2) to the wrapping section 14. The wrapping film 24 forms a tube around the plurality of products 20 being fed into the wrapping section 14 by the feed unit 12. The sealing and cutting section 16, which is shown in FIGS. 1 and 2, supports the product 20 and the wrapping film 24 (see FIG. 2). The product 20 traverses in a left to right direction (i.e., upstream to downstream direction) as shown by arrow 26 in FIG. 2.

The sealing and cutting section 16 comprises a rotary head assembly 28 in which an upper seal bar 30 and a lower pressure pad 32 forms a cross seal on the tube of the wrapping film 24 and cuts the tube of wrapping film 24. When the film 24 on the front (i.e., downstream) side of the product 20 is sealed and cut and the film 24 on the rear (i.e., upstream) side of the product 20 is sealed and cut, an individually wrapped product 20 is provided downstream of the sealing and cutting section 16, as shown in FIG. 2.

The sealing and cutting section 16 incorporates one or more of four unique aspects which will be discussed in detail below. First, the rotary head assembly 28 has an internal sliding mechanism 34 (see FIG. 3). The sliding mechanism 34 permits the upper seal bar 30 and the lower pressure pad 32 to maintain its angular orientation (preferably, vertical) as upper and lower rotating drums 36, 38 (see FIG. 2) rotate in the direction shown by arrows 40, 42 (see FIG. 2). Additionally, the sliding mechanism 34 provides quiet operation of the sealing and cutting section 16. The upper and lower drums 36, 38 may be sealed and contain lubricants such that lubrication and maintenance do not have to be performed on a frequent basis. The sliding mechanism has substantially less back lash compared to gearing systems. Since the sliding mechanism holds a tighter tolerance than gearing systems, the sliding mechanism encourages a more consistent positive pressure upon the film which results in consistently stronger seals and positive bag cutoffs thereby producing fewer rejects and higher efficiencies.

Second, the rotational speed of the upper and lower drums 36, 38 may be continuously varied as a function of product height 44 (see FIG. 2), product length 46 (see FIG. 2) and angular position. By adjusting the rotating speed of the upper and lower drums 36, 38, a wider range of products may be wrapped by the film sealing and wrapping machine 10 and a tighter bag 52 (see FIG. 2) may be formed around the product 20. Also, a cleaner seal and cut is formed.

Third, the upper seal bar 30 and the lower pressure pad 32 are both spring loaded. Beneficially, the spring forces of the upper seal bar 30 and the lower pressure pad 32 may be adjusted such that the seal bar 30 and pressure pad 32 may self align when in contact with each other such that the seal bar 30 and pressure pad 32 may apply even pressure on the film 24 and not distort the film 24.

Fourth, the sealing and cutting section 16 may comprise a single belt 48 (see FIG. 2) that is wrapped around a plurality of pulleys 50 such that the belt 48 receives the product 20 and the tube of wrapping film 24 upstream of the seal bar 30 and pressure pad 32 as well as receives the individually wrapped product 20 in film bags 52 downstream of the seal bar 30 and pressure pad 32, as shown in FIG. 2. The belt 48 forms a gap 54 (see FIG. 2) which is mechanically linked to a lateral position of the seal bar 30 and the pressure pad 32. As the upper and lower drums 36, 38 rotate in the direction of arrows 40, 42, the lateral position of the seal bar 30 and pressure pad 32 reciprocates from a left to right direction and a right to left direction. The gap 54 mechanically tracks the lateral position of the seal bar 30 and the pressure pad 32 through a control carriage mechanism.

Figure 3:
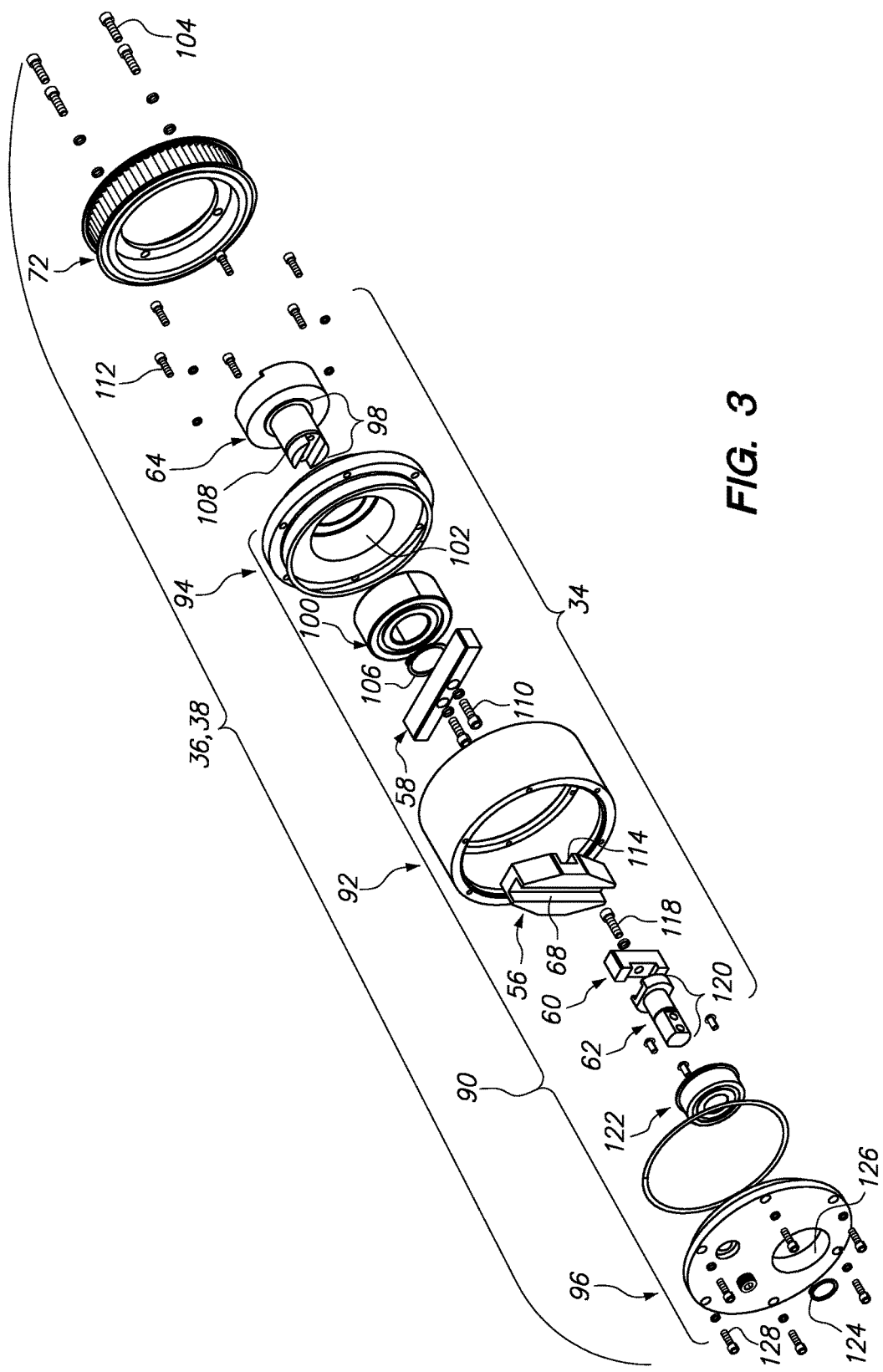
FIG. 3 is an exploded view of a rotary drum of the sealing and cutting section shown in FIG. 1.

As discussed above, one aspect of the sealing and cutting section 16 is the internal sliding mechanism 34 which is shown in FIG. 3. The internal sliding mechanism 34 may comprise a slider 56 which slides in a lateral direction along horizontal slide 58. The sliding mechanism 34 may additionally include a vertical slide 60 which slides in a vertical direction with respect to the slider 56. A crank throw 62 may be mounted to the vertical slide 60 and may also be mounted to the seal bar 30 or the pressure pad 32 as the situation dictates. As discussed above, the seal bar 30 and the pressure pad 32 maintain an angular orientation (preferably, vertical) as the upper and lower drums 36, 38 rotate. The angular orientation is maintained because the horizontal slide 58 does not rotate but is fixed to a yoke 64 which is attached to a frame 66 (see FIGS. 2 and 5) of the sealing and cutting section 16. The horizontal slide 58 remains stationary as the drums 36, 38 rotate. The slider 56 slides horizontally along a path defined by the horizontal slide 58. The vertical slide 60 is traversed up and down along a groove 68 of the slider 56. The yoke 64, horizontal slide 58, slider 56 and the vertical slide 60 do not rotate but longitudinally slide against each other. This configuration allows the crank throw 62 to be located off center from a central rotating axis 140, 142 (see FIG. 6) of the drums 36, 38 to permit circular motion of the seal bar 30 or the pressure pad 32 and maintain angular orientation of the seal bar 30 and pressure pad 32 throughout the entire rotation of the upper and lower drums 36, 38.

Referring now to FIG. 4A, one of the upper or lower drums 36, 38 is shown. The rotation of the drums 36, 38 may rotate in a clockwise direction or a counterclockwise direction depending on whether the drum is the upper drum 36 or the lower drum 38. The upper and lower drums 36, 38 rotate in reverse directions, as shown in FIG. 2. Accordingly, the concepts discussed with respect to FIGS. 4A-4D may apply to the upper drum 36 or the lower drum 38 but in an opposite manner. Beginning with FIG. 4A, the crank throw 62 is located at the 6 o'clock position. As the drum 36, 38 rotates in a clockwise direction, the vertical slide 60 is traversed upward in the groove 68. Also, the slider 56 is traversed to the left along the horizontal slide 58. Both sliding actions are accomplished in a smooth and non-jerky fashion. Unlike gears with teeth that must have multiple teeth releasing and engaging throughout the rotation, the sliding mechanism 34 does not have a gear with teeth. Rather, a smooth quiet sliding action is accomplished between lubricated components continuously in contact with each other. The sliding mechanism 34 is quieter than geared mechanisms and is not jerky because the sliding mechanism 34 does not engage and release multiple teeth at the same time.

The crank throw 62 is now traversed from the 9 o'clock position shown in FIG. 4B to the 12 o'clock position shown in FIG. 4C. To this end, the crank throw 62 is traversed upward as the vertical slide 60 continues its upward traversal in groove 68. Also, the slider 56 traverses back to the center. The crank throw 62 is traversed to the 3 o'clock position as shown in FIG. 4D then back to the 6 o'clock position as shown in FIG. 4A to complete the cycle. As can be seen from the discussion above, the seal bar 30 and the pressure pad 32, which may be mounted to the crank throw 62, maintains an angular orientation (preferably, vertical orientation) while also traversing along a circular path corresponding to a circular path 70 (shown in dash lines in FIGS. 4A-4D).

The upper and lower drums 36, 38 may additionally include a driven timing belt pulley 72 (see FIG. 3) which may be driven by belt 86 (see FIG. 2). The belt 86 wraps around the upper drum 36 as well as the lower drum 38 so that the upper and lower drums 36, 38 rotate in reverse directions. The belt 86 may travel in a direction shown by arrow 88 (see FIG. 2).

Referring back to FIG. 3, the upper and lower drums 36, 38 may additionally include a housing 90. The housing 90 may have a casing 92, a backing plate 94 and a cover plate 96. As discussed above, the yoke 64 is fixedly attached to the frame 66 (see FIGS. 2 and 5) of the sealing and cutting section 16. However, it is also contemplated that the yoke 64 may be attached to other stationary objects of the film sealing and wrapping machine 10. The yoke 64 may additionally have a post 98 upon which a bearing 100 is mounted. The backing plate 94 is initially pushed onto the yoke 64. To this end, the bearing 100 is disposed on the post 98 as well as on an interior surface 102 of the backing plate 94. The backing plate 94 is also attached to the driven timing belt pulley 72 by bolts 104. As the belt 86 (see FIG. 2) drives the driven timing belt pulley 72, the backing plate 94 rotates the cover plate 96 but the yoke 64 does not rotate. The bearing 100 is retained on the post 98 by retaining ring 106 which fits within retaining ring groove 108. The horizontal slide 58 is mounted to the post 98 with bolts 110. The casing 92 is attached to the backing plate 94 with bolts 112.

The slider 56 may have a groove 114. The horizontal slide 58 is received within the groove 114. The engagement of the horizontal slide 58 and the horizontal groove 114 of the slider 56 limits movement of the slider 56 to horizontal left and right movements. The vertical slide 60 and the crank throw 62 may be fixedly attached to each other by bolt 118. The crank throw 62 may have a post 120 upon which a bearing 122 is mounted. The bearing 122 is retained on the post 120 by retaining ring 124 fitted within a groove of the post 120. The crank throw 62 is mounted to the cover plate 96 by mounting bearing 122 in an aperture 126 of the cover plate 96. The cover plate 96 is mounted to the casing 92 via bolts 128. When mounted, the vertical slide 60 is disposed within groove 68 of the slider 56.

The belt 86 drives the driven timing belt pulley 72 in either a clockwise or counterclockwise direction depending on whether the belt 86 is driving the upper or lower drum 36, 38. Rotational motion is imparted to the bearing 122 and the crank throw 62 by the cover plate 96. The angular orientation of the corresponding seal bar 30 or pressure pad 32 remains constant throughout the entire travel of the corresponding seal bar 30 or pressure pad 32 along a circular path corresponding to the circular path 70. To this end, the vertical slide 60 slides within groove 68 of the slider 56 and the slider 56 slides along the horizontal slide 58 as discussed above in relation to FIGS. 4A-4D.

Although the sliding mechanism 34 discussed above shows the horizontal slide 58 in a generally horizontal orientation and the vertical slide 60 traversing along a generally vertical path, the slide 58 may be positioned at any angle (i.e., 360 degrees). Nonetheless, the groove 68 of the slider 56 and the groove 114 of the slider 56 are generally perpendicular to each other. Accordingly, the slider 56 and the slide 60 traverse along paths that are perpendicular to each other.

Figure 5:
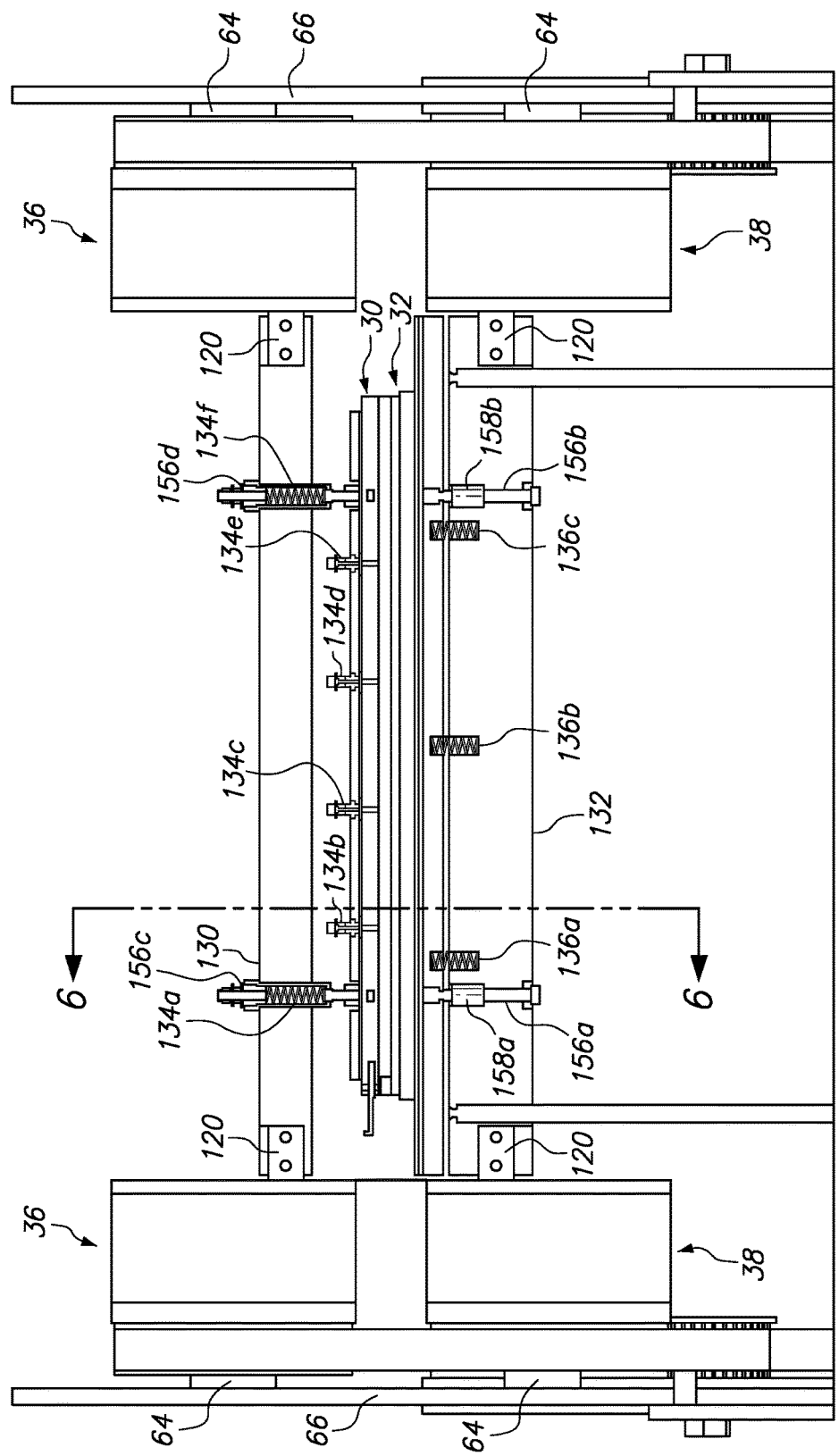
FIG. 5 is a cross sectional view of the sealing and cutting section shown in FIG. 1.

Referring now to FIG. 5, two rotating upper drums 36 confer rotation on the upper seal bar 30 along its circular path during rotation of the upper drums 36. The upper drums 36 are connected to the seal bar 30 in the following manner. The post 120 of the crank throw 62 (see FIGS. 3 and 5) for each upper drum 36 is attached to opposed distal end portions of a main upper cross bar 130. The seal bar 30 is attached in a spring loaded manner to the main upper cross bar 130. The lower pressure pad 32 may also be attached to the lower rotating drums 38 in a similar fashion. In particular, the post 120 (see FIGS. 3 and 5) of each lower rotating drum 38 may be attached to a lower main cross bar 132 which is subsequently attached to the lower pressure pad 32 in a spring loaded manner. Note that the yokes 64 of the upper and lower drums 36, 38 are attached to the frame 66 of the sealing and cutting section 16, as discussed above.

As discussed above, the spring loaded aspect of the seal bar 30 and the pressure pad 32 provides certain benefits as discussed herein. By way of example and not limitation, the spring loaded upper seal bar 30 and the spring loaded lower pressure pad 32 are self-aligning. For example, if the left side of the upper seal bar 30 and the lower pressure pad 32 contacts before the right side thereof 30, 32, or vice versa, the springs level the upper seal bar 30 and the lower pressure pad 32 to each other. It is also contemplated that the stroke of the spring may be adjustably increased or decreased with an adjustment nut or screw to respectively increase or decrease the dwell time (i.e., contact time) of the upper seal bar 30 and the lower pressure pad 32. The stroke adjustment encourages improved sealing and cutting of a greater range of film gauges and formulations (i.e., types).

Figure 6:
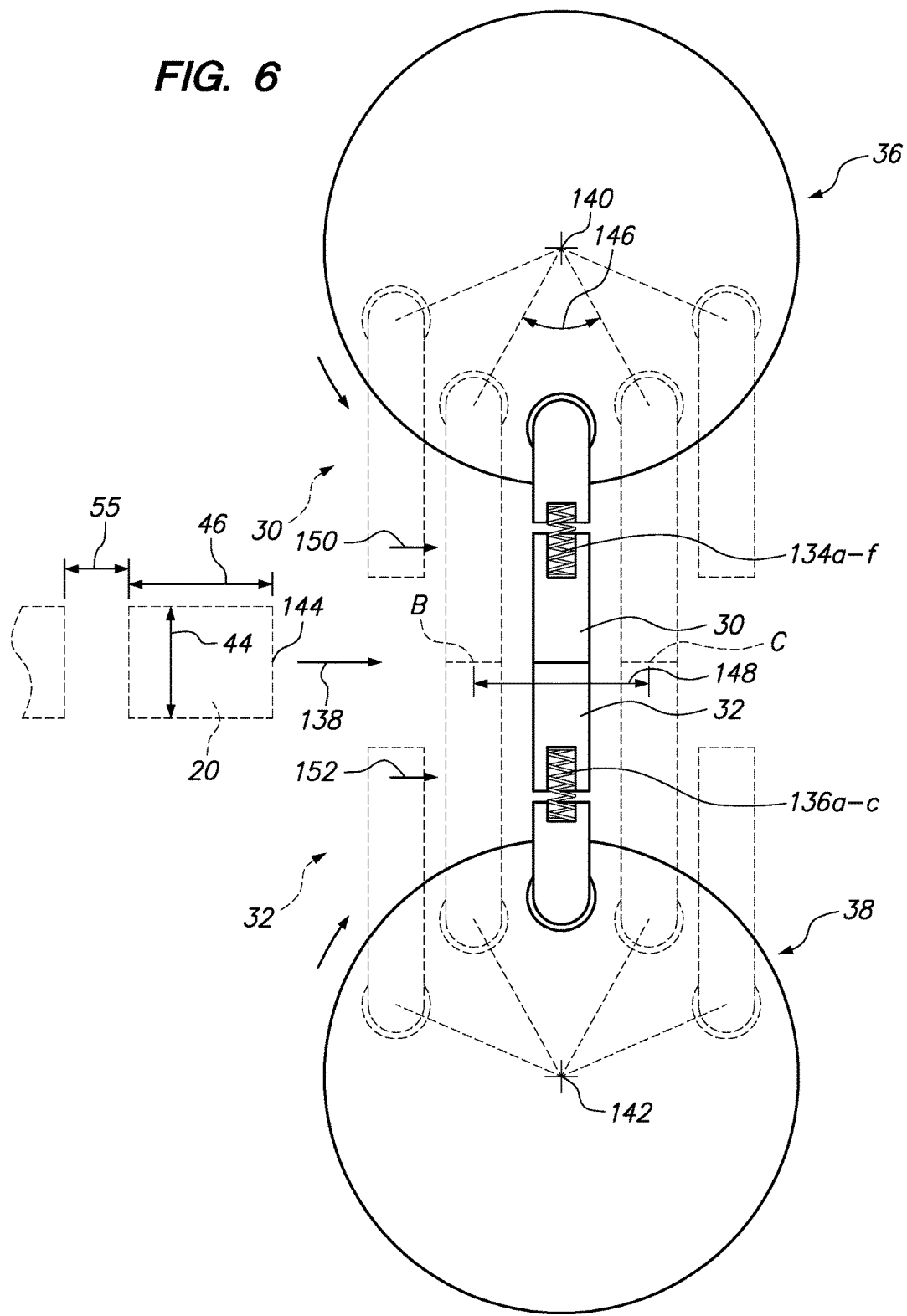
FIG. 6 illustrates upper and lower rotating drums as the seal bar and pressure pad are traversed.

Referring now to FIG. 6, before the seal bar 30 and the pressure pad 32 contact each other, the springs 134a-f (see FIGS. 5 and 6) of the seal bar 30 are preloaded. Springs 134a-f are shown as one spring for clarity in FIG. 6. Likewise, the springs 136a-c (see FIGS. 5 and 6) of the lower pressure pad 32 are preloaded. Springs 136a-c are shown as one spring for clarity in FIG. 6. The springs 134a-f are preloaded to have a cumulative spring force about equal to the cumulative spring force of the springs 136a-c. It is contemplated that the preload on the springs 134a-f and/or springs 136a-c may be adjusted via a nut. Also, it is contemplated that the spring force of the springs 134a-f and/or springs 136a-c may be adjusted via a nut or by replacing the springs with stronger or weaker springs. Also, the spring constant of the springs 134a-f as a whole is about equal to the spring constant of the springs 136a-c as a whole.

As the upper and lower drums 36, 38 rotate, the seal bar 30 and the pressure pad 32 make contact (see pt. B in FIG. 6) with each other and the film 24 (film not shown in FIG. 6 for clarity). As the upper and lower drums 36, 38 continue to rotate, the seal bar 30 maintains contact with the pressure pad 32. Moreover, the point of contact between the seal bar 30 and the pressure pad 32 is generally maintained within a plane defined by the path of travel 138 of the product 20. Preferably, the point of contact between the seal bar 30 and the pressure pad 32 is located at a midpoint between a rotating axis 140 of the upper rotating drum 36 and a rotating axis 142 of the lower rotating drum 38. The point of contact is also preferably aligned to about a vertical midpoint 144 of the product 20. Since the contact point between the seal bar 30 and the pressure pad 32 is maintained at generally the midpoint 144 of the product 20 or at a constant point as the film 24 is being sealed and cut by the sealing and cutting section 16, the seal bar 30 and the pressure pad 32 do not deform the film 24 during the sealing and cutting process. The seal bar 30 and the pressure pad 32 maintain contact for a defined angle of rotation 146 as well as a defined linear length 148 corresponding to the angle of rotation 146. After the upper and lower rotating drums 36, 38 have proceeded through the angle of rotation 146, the seal bar 30 disengages the pressure pad 32 after point C shown in FIG. 6.

Referring now to FIG. 5, springs 136a-c are disposed between the lower pressure pad 32 and the lower main cross bar 132. Guide rods 156a, b are disposed within sleeves 158a, b and attached to the pressure pad 32. In relation to the seal bar 30, the same is attached to the main upper cross bar 130 with guide rods 156c, d. The guide rods 156c, d are spring loaded with the springs 134a, f. Springs 134b-e also provide a downward spring force to the seal bar 30. If the seal bar 30 is spring loaded and the pressure pad 32 is not spring loaded, then the springs 134a-f must deflect the entire amount to ensure proper sealing and cutting of the film 24. Fortunately, in the film sealing and wrapping machine 10 discussed herein, the upper seal bar 30 and the pressure pad 32 may both be spring loaded. The springs 136a-c and the springs 134a-f each deflect a smaller amount compared to the situation where only the upper seal bar 30 is spring loaded or only the lower pressure pad 32 is spring loaded. This allows a higher throughput through the rotary head assembly 28.

The film sealing and wrapping machine 10 is capable of forming film bags 52 (see FIG. 2) around products 20 of various lengths 46 (see FIGS. 2 and 6) and heights 44 (see FIGS. 2 and 6). The products 20 flow through the machine 10 along the path of travel 138 (see FIG. 6) in a sequential manner one after the other. The sealing and cutting section 16 seals the tube of film 24 and cuts the same between adjacent products 20. In this manner, the product 20 is enclosed within the bag 52 of film. The speed of rotation of the upper and lower drums 36, 38 is adjusted to the product length 46 and the product height 44 to prevent the seal bar 30 and the pressure pad 32 from hitting adjacent products 20 as the seal bar 30 and pressure pad 32 enter a gap 55 (see FIGS. 2 and 6). Also, the speed of rotation of the upper and lower drums 36, 38 is adjusted to the product length 46 and the product height 44 to prevent the seal bar 30 and the pressure pad 32 from hitting adjacent products 20 as the seal bar 30 and pressure pad 32 leave the gap 55.

The seal bar 30 and the pressure pad 32 must make one revolution from one gap 55 defined by adjacent products 20 to the next gap 55 defined by subsequent adjacent products. The time it takes the seal bar 30 and the pressure pad 32 to make one revolution must generally equal the time it takes two gaps 55 to pass the same point in the sealing and cutting section 16. The sealing and cutting section 16 seals the film 24 at the frontal (i.e., downstream) end of the product 20. When the seal bar 30 and the pressure pad 32 are in contact with each other (i.e., during the angle of rotation) the horizontal speed 150, 152 of the seal bar 30 and the pressure pad 32 is generally equal to the speed of the product 20 or belt 48. This prevents the seal bar 30 and the pressure pad 32 from pushing or pulling the film 24 thereby preventing deformation of the film 24.

After the seal bar 30 and the pressure pad 32 rotate through the angle of rotation 146, the speed of the rotating drums 36, 38 may be changed (e.g., accelerated) such that the seal bar 30 and the pressure pad 32 moves out of the way of the upstream product 20 and does not hit the back end of the adjacent downstream product 20. For example, after the seal bar 30 and pressure pad 32 has cleared adjacent products 20, the seal bar 30 and the pressure pad 32 may be accelerated to its outer most position. For the seal bar 30, this is the 12 o'clock position. For the pressure pad 32, this is the 6 o'clock position. For long products, the product 20 passes between the seal bar 30 and the pressure pad 32 while the seal bar 30 and the pressure pad 32 wait (i.e., stop) at this outer most position. As the back end of the product 20 approaches the seal bar 30 and pressure pad 32, the upper and lower rotating drums 36, 38 rotate and accelerate the upper seal bar 30 and the pressure pad 32 between the upcoming gap 55. The rotational cycle of the drums 36, 38 is then completed. In this manner, the rotating drums 36, 38 rotate one revolution for each product or bag length.

For long products (i.e., products that require a bag length greater than a circumference of the circular path 70), the horizontal travel speed of the seal bar 30 and pressure pad 32 during contact is equal to the horizontal speed of the product 20 but at some point after the angle of rotation 146, the rotational speed of the upper and lower drums 36, 38 slows down or stops such that the time for one revolution of the upper and lower drums 36, 38 is equal to the time required for one bag length to pass through the sealing and cutting section 16. Conversely, for products that require a short bag length (i.e., a bag length which is less than a circumference of the circular path 70), the rotational speed of the upper and lower drums 36, 38 is at some point accelerated after the angle of rotation 146 such that the time for one revolution of the upper and lower drums 36, 38 is equal to the time for one bag length to traverse through the sealing and cutting section 16.

For thin products, there is little or no risk that the seal bar 30 and the pressure pad 32 will hit the front end of the incoming product 20 or hit the back end of the outgoing product 20. As such, the rotational speed of the upper and lower drums 36, 38 may be adjusted (e.g., accelerated) immediately before and after the angle of rotation 146. However, for thicker products, the seal bar 30 and pressure pad 32 may hit the front end of the incoming product 20 as the seal bar 30 and pressure pad 32 approach each other to begin the sealing and cutting process. Also, the seal bar 30 and pressure pad 32 may hit the back end of the outgoing product 20 after completion of the sealing and cutting process. To mitigate this risk, the horizontal speed 150, 152 (see FIG. 6) of the seal bar 30 and the pressure pad 32 may equal the speed of product 20 or belt 48 traveling through the sealing and cutting section 16 for a greater angle than the angle of rotation 146. When the horizontal speed of the seal bar 30 and the pressure pad 32 is equal to the belt speed of the sealing and cutting section 16 or product 20, the seal bar 30 and the pressure pad 32 is said to have a position lock on the products 20 or belt 48. The amount of position lock varies as a function of product height 44. For thin products, the amount of position lock equals the angle of rotation 146. For thicker products, the amount of position lock can theoretically occur at the 9 o'clock position to the 3 o'clock position for the upper drum 36. By way of example and not limitation, the amount of position lock is approximately 30 degrees on either side when the seal bar 30 is at the 6 o'clock position and pressure pad 32 is at the 12 o'clock position (see FIG. 6).

For most lengths and thicknesses of products, the horizontal speed of the seal bar 30 and the pressure pad 32 during the angle of rotation 146 is equal to the linear speed of the belt 48. For products 20 that require a bag length shorter than the circumference of the circular path 70 (see FIG. 4A) of the drum 36, 38, the rotational speed of the drums 36, 38 must be accelerated at some point after the angle of rotation 146 such that the time for one revolution of the drums 36, 38 is equal to the time for one bag length to traverse through the sealing and cutting section 16. For short and thin products, the speed of the drums 36, 38 may be accelerated immediately after the angle of rotation 146. However, for short but thicker products, the amount of position lock increases to an amount greater than the angle of rotation 146 to an extent that the seal bar 30 and pressure pad 32 may be accelerated out of the gap 55 or into the gap 55 without hitting adjacent products 20.

For long but thin products, during the angle of rotation 146, the horizontal speed 150, 152 of the seal bar 30 and the pressure pad 32 is equal to the linear speed of the belt 48. Long products require a bag length greater than the circumference of the circular path 70 of the drum 36, 38. After the angle of rotation 146, the seal bar 30 and the pressure pad 32 has additional time to make one revolution since the bag length is greater than a circumference of the circular path of travel 70. As such, the seal bar 30 and the pressure pad 32 may be accelerated, decelerated, or a combination thereof to the outermost position and stopped to wait for the subsequent gap 55 between adjacent products 20. Alternatively, the seal bar 30 and the pressure pad 32 may be slowed down or decelerated to synchronize the seal bar 30 and the pressure pad 32 to meet up with the subsequent gap 55. As the thickness of the long product 20 increases, the amount of position lock increases to an amount greater than the angle of rotation 146 to an extent that the seal bar 30 and pressure pad 32 may be accelerated out of the gap 55 or into the gap 55 without hitting adjacent products 20. The seal bar 30 and the pressure pad 32 may be accelerated to its outermost position and stopped to wait for the subsequent gap 55 between adjacent products 20 or the seal bar 30 and the pressure pad 32 may be decelerated to time the seal bar 30 and the pressure pad 32 to meet up with the subsequent gap 55. Alternatively, it is contemplated that after the angle of rotation 146, the seal bar 30 and the pressure pad 32 may be accelerated out of the gap 55 to clear the product 20 then decelerated or stopped at its outermost position. As the upcoming gap 55 approaches, the seal bar 30 and the pressure pad 32 may be accelerated into the upcoming gap 55. At some point, the horizontal speed 150, 152 of the seal bar 30 and pressure pad 32 may be adjusted to establish position lock.

Figure 7:
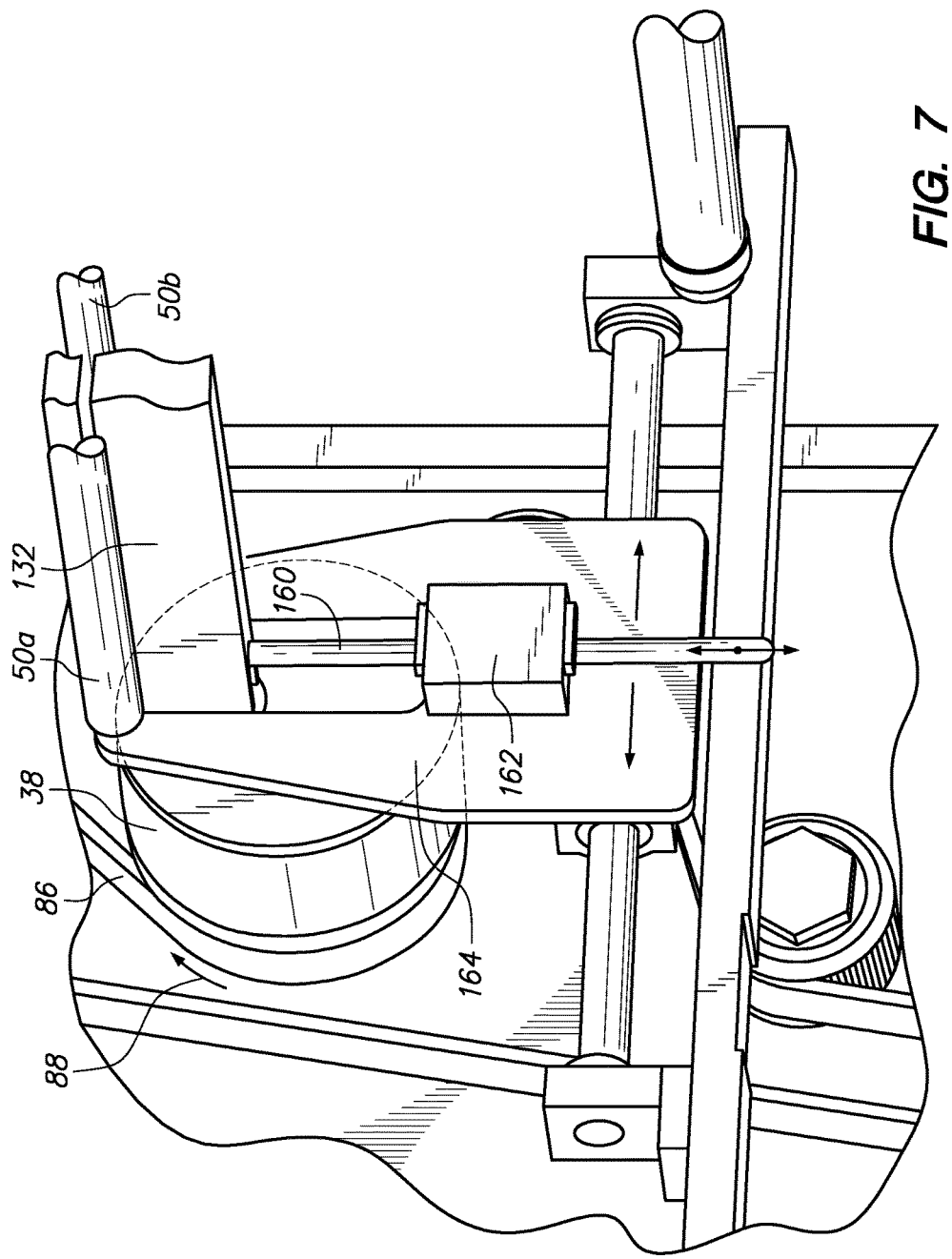
FIG. 7 is a perspective view of a control carriage.

Referring now to FIG. 7, a perspective view of a lower rotating drum 38 is shown. The lower rotating drum 38 is driven by belt 86 travelling in the direction 88. As shown in FIG. 2, the belt 48 upon which the product 20 rests upon is a single belt that loops through pulleys 50. The single belt 48 is located downstream and upstream of the seal bar 30 and the pressure pad 32 to form the gap 54 which tracks the horizontal position of the seal bar 30 and the pressure pad 32. In order for the gap 54 to track the position of the seal bar 30 and pressure pad 32, the lower main cross bar 132 (see FIG. 7) may be mechanically connected to an elongate bar 160. The elongate bar 160 may extend downwardly. The elongate bar 150 may be engaged through a linear bearing box 162 within which there is a linear bearing that allows the bar 160 to slide vertically up and down as the lower main cross bar 132 follows the circular path 70 and as the lower drum 38 rotates. The elongate bar 160 also imposes horizontal forces to push a carriage 164 left and right. The rollers 50a, b which define the gap 54 may be mounted to the carriage 164. In this manner, the gap 54 tracks the horizontal position of the seal bar 30 and the pressure pad 32.

In a further aspect of the sealing and cutting section 16, the upper seal bar 30 and the lower pressure pad 32 may both be heated. This is especially useful for running cold or frozen products which remove residual heat from the seal pad during the sealing and cutting process. The additional heat from the pressure pad 32 provides for a stronger seal at higher speeds or through put.

In an aspect of the film sealing and wrapping machine, the film may be a shrink wrap film, polyolefin, polyethylene, PVC, etc.

The above description is given by way of example, and not limitation. Given the above disclosure, one skilled in the art could devise variations that are within the scope and spirit of the invention disclosed herein, including various ways of spring loading the seal bar 30 and the pressure pad 32. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A film sealing and wrapping machine for sealing and cutting a tube of film wrapped around a product to form a film bag with the product enclosed within the film bag, the machine comprising:
    a seal and cut jaw assembly for sealing and cutting the tube of film, the jaw assembly comprising:
        opposing upper rotating drums;
        an upper cross bar mounted between the upper rotating drums for rotation therewith;
        opposing lower rotating drums;
        a lower cross bar mounted between the lower rotating drums for rotation therewith,
        rotation of the upper and lower drums and upper and lower cross bars being synchronized so the upper and lower cross bars approach each other and traverse away from each other in unison in a direction of travel of the tube of film;
        a seal bar, spring mounted to the upper cross bar by a pair of seal bar springs; and
        a pressure pad, spring mounted to the lower cross bar by a pair of pressure pad springs,
        wherein the seal bar and pressure pad align with one another upon contacting a section of film therebetween by compression of the seal bar springs and pressure pads springs, the seal bar and pressure pad forming seals and cuts on the film bag,
    wherein the upper and lower drums each include an internal sliding mechanism, the internal sliding mechanism including a first slider for sliding in a lateral direction along a horizontal slide and a second slider for sliding in a vertical direction within the first slider and relative to the first slider,
    wherein the upper cross bar is operably mounted to the upper drums by the upper drum internal slider mechanism and the lower cross bar is mounted to the lower drums by the lower drum internal slider mechanism, and
    wherein the seal bar and the pressure pad maintain an angular orientation as the upper and lower drums rotate; and
    a conveyor system disposed adjacent to the seal and cut jaw assembly for delivering the product wrapped with film between the upper and lower cross bars and for transporting the film bag with product disposed therein away from the seal and cut jaw assembly.

2. The machine of claim 1 wherein a stroke of the seal bar and a stroke of the pressure pad is adjustable.

3. The machine of claim 2 wherein the stroke of the seal bar and the stroke of the pressure pad is adjustable by changing out the seal bar springs and the pressure pad springs to allow for more or less deflection.

4. The machine of claim 1 wherein spring forces of the seal bar springs and the pressure pad springs are adjustable.

* * * * *